United States Patent Office 2,992,956
Patented July 18, 1961

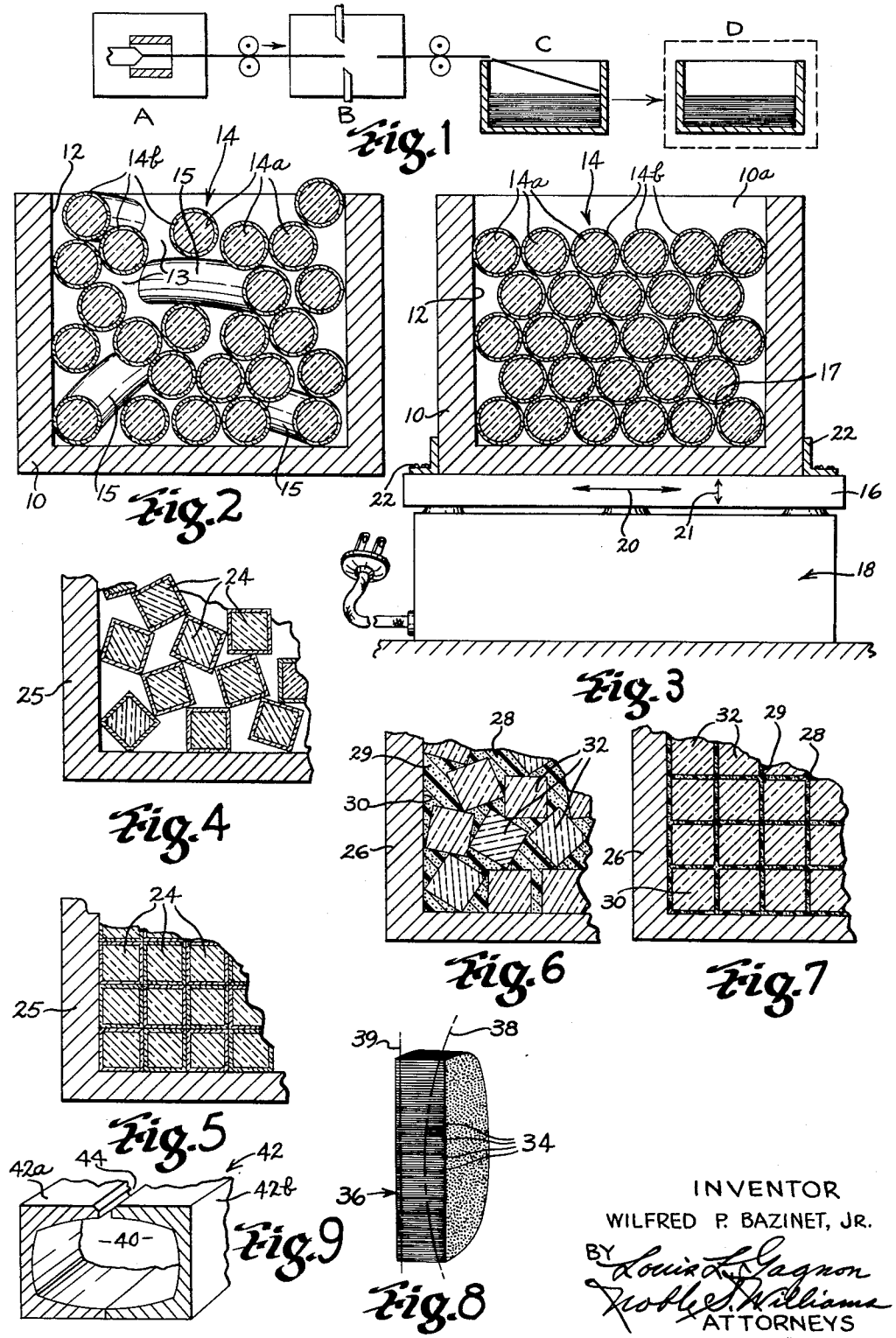
July 18, 1961     W. P. BAZINET, JR     2,992,956
METHOD FOR MAKING FIBER OPTICAL DEVICES
Filed Feb. 14, 1958
INVENTOR
WILFRED P. BAZINET, JR.

2,992,956
METHOD FOR MAKING FIBER OPTICAL DEVICES
Wilfred P. Bazinet, Jr., Webster, Mass., assignor to American Optical Company, Southbridge, Mass., a voluntary association of Massachusetts
Filed Feb. 14, 1958, Ser. No. 715,406
6 Claims. (Cl. 154—90)

This invention relates to light-conducting fiber optical components and devices formed therefrom and has particular reference to improved means and method of manufacturing such devices and components by a technique which embodies novel efficient means and method for accurately and expediently aligning and assembling a multiplicity of similarly shaped fibrous light-conducting filaments to form a composite structure capable of transmitting image forming light produced at one end of said structure through the same and accurately reproducing said image forming light at the other end thereof.

In the manufacture of devices of the above character wherein a great number of thin, elongated transparent rods or fibers formed of light-conducting medium are bundled together and used to transmit image forming light from one location to another, it is essential that each fiber of the bundle be orderly and accurately positioned therein so as to cause the opposite ends of the bundle to be substantially geometrically identical in character. That is to say, the opposite ends of each of the fibers of the bundle should be in the same relative locations with respect to the ends of the other fibers of said bundle so as to cause image forming light which is directed into the entrance end of the bundle to be transferred through the bundle and accurately reproduced at the exit end thereof.

This may be accomplished by aligning the individual fibers in fixed parallel side-by-side contacting relation with each other in a manner which is disclosed in a co-pending application Ser. No. 669,883 to cause the geometrical cross-sectional configuration of the ends of a bundle of fibers thus formed to be substantially identical. Said application was filed July 3, 1957, in the name of F. H. Norton and assigned to assignee of this application.

In instances where a great number of relatively small and flexible light-conducting fibers are to be assembled, considerable difficulty has been encountered in accurately aligning each of the individual fibers and the task has become tedious, time consuming and practically insurmountable when dealing with relatively long fibers which are extremely small in cross section such as, for example, in the order of .010 of an inch or less in diameter and 6 inches or longer in length.

The improved method and apparatus of the present invention not only includes means for rapidly and accurately forming a very large number of light conducting members or elements into a compact bundle or assembly having the separate individual elements thereof arranged, at least in so far as their opposite ends are concerned, in an exact geometrical cross-sectional configuration and also in exact side-by-side relation but also include method steps whereby such optical devices may be produced in a rapid and inexpensive manner.

It is accordingly, a principal object of this invention to provide in a process for making fiber optical devices or components, simple, inexpensive and efficient means and method for rapidly and accurately assembling a plurality of elongated substantially straight light-conducting elements in predetermined individually aligned side-by-side parallel relation with each other so as to produce at least preselected cross-sections of the assembled elements substantially identical geometric cross-sectional configurations so that thereafter the entire assembly or at least two longitudinally spaced portions of the assembly (for example the exposed opposite ends of the assembly) may have the elements thereof bound, fused, cemented or otherwise secured together to provide permanent cross-sections of substantially identical characters for said spaced portions of the optical device or component being produced.

Another object of the invention is to provide novel means and method for efficiently and rapidly producing optical devices and/or components which, in each case, are formed of a multiplicity of elongated straight light-conducting elements secured in fixed side-by-side relation with each other either throughout their lengths to form a rigid structure or at their opposite ends only to produce a flexible structure or even at spaced locations along the length of the device to produce a semi-flexible structure, said structures in each instance having substantially identically geometrically patterned cross-sections at the opposite ends thereof.

Another object is to provide, more particularly in a process of the above character, improved means for assembling a plurality or even a very large number of relatively fine substantially straight fiber-like light-conducting elements in predetermined aligned side-by-side and compactly nested relation with each other.

It is a further object to provide, in combination with the apparatus of the invention, high speed vibrating means to operate said apparatus for rapidly, efficiently and accurately aligning a plurality of fiber-like light-conducting elements which are used to form optical image transfer devices or components.

It is also an object of the invention to provide novel means for orderly and accurately assembling a plurality of very small light-conducting rods or fibers of the above character and then providing light-insulating means between all adjacent fibers of the assembly, and which insulating means is such as to not only prevent any substantial optical interaction between adjacent fibers but also such as to prevent any appreciable light absorption while further functioning as a bonding agent to secure said fibers in fixed aligned relation with each other.

Other objects and advantages of the invention will become apparent from the following description when taken in conjunction with the accompanying drawings in which:

FIG. 1 is a diagrammatic illustration, in block form, of a process for forming fiber optical articles or devices in accordance with the invention;

FIG. 2 is an enlarged transverse cross-sectional view of an assembly device and elements being assembled in accordance with the process of the invention;

FIG. 3 is a view generally similar to FIG. 2 illustrating a further step in the process of the invention and including vibratory means for accomplishing the same;

FIGS. 4 and 5 are enlarged fragmentary cross-sectional views of one modified form of elements in two different stages of being processed in accordance with the invention;

FIGS. 6 and 7 are views similar to FIGS. 4 and 5 but showing a different modified form of elements in two different stages of the process;

FIG. 8 is a perspective view of a fragmentary portion of a blank which has been made in accordance with the invention and which may be used in the formation of one preferred form of image-transfer devices; and FIG. 9 is a perspective view showing, by way of example, a fragmentary portion of a two-part mold-like receptacle or support for use in carrying out the present invention.

There is shown in FIG. 1 of the drawings, a block diagram illustrating four of the basic steps in a process used to produce fiber optical devices or components each consisting of a very large number of thin elongated members or fibers of light-conducting medium in fixed side-by-side parallel relation with each other.

Briefly stated, the process embodies one or more cycles each comprising a first step A of initially withdrawing from a relatively large rod or bar of light-conducting material such as glass, plastic or the like, a fiber which is of considerable length and which consequently is simultaneously considerably reduced in cross-sectional area; a second step B of cutting the drawn fiber into predetermined substantially equal lengths; a third step C of assembling these lengths of fibers in a compact group or bundle in side-by-side parallel relation with each other; and a fourth step D of fusing, bonding, or otherwise securing the grouped fibers together so as to form a composite fiber optical device or component having a plurality of closely related individual light-conducting channels extending from one end thereof to the other.

In a process of the type briefly described hereinabove, the assembling of the light-conducting fibers (step C) has, previous to the present invention, presented a serious "bottleneck" in the production of fiber optical devices and components particularly when dealing with light-conducting fibers which are relatively small in cross-sectional size and which are inherently flexible.

It is to be understood that in order to form a fiber optical device of the type disclosed which is capable of accurately transferring an optical image from one location to another, it is essential, first of all, that the individual light-conducting members or fibers thereof be grouped in accurately aligned parallel side-by-side nested relation with each other so as to cause the opposite ends of the group to be identically geometrically patterned; whereby each part of the light of an optical image which is admitted at the entrance end of each fiber of a group of light-conducting fibers will be emitted from the exit end of said group of fibers in its true location and thus reproduce a similar image. Secondly, it is pointed out that the degree of resolution of an image provided at the exit end of such a fiber optical device is very much dependent upon the fineness of cross-sectional size of the individual fibers thereof and the uniformity and compactness with which they are bundled together. That is to say, the smaller fibers and the more compact uniform groupings produce the best image resolution.

In co-pending application Ser. No. 669,883 there is shown and described means and a method for producing and assembling thin elongated light-conducting members in side-by-side parallel engaging relation with each other and this means includes a support having an elongated recess of a suitable size and shape. It should be appreciated, however, that in the process of this earlier filed application it has been necessary to more or less individually place each of the thin elongated members in the support so as to properly align the same, and this task of accurately aligning the individual members was exceedingly tedious, difficult and time consuming, particularly when dealing with light-conducting members or fibers which are relatively small in cross-sectional sizes. While the method of assembly and apparatus disclosed in application Ser. No. 669,883 may be used with a degree of success to assemble light-conducting members or fibers which are of fairly small size and thus relatively rigid to form a bundle of fibers which might find utility in certain places where only a moderate degree of image resolution is required, nevertheless, in cases wherein higher degrees of resolution are desired, or required, such an earlier assembly technique is extremely difficult or nearly impossible to perform in any practical manner.

In the present invention, however, there is provided improved electrically operated power means for rapidly and efficiently performing the assembling operation (step C) of the process of FIG. 1. This means embodies, as shown in FIGS. 2 and 3, an open box type of support 10 having an elongated troughlike recess 12 therein of a length substantially equal to or a little longer than the length of the individual fibers to be assembled therein. The support 10 is preferably formed of a ceramic or carbonaceous material, or even a metal which is adapted to withstand relatively high temperatures without appreciably distorting during subsequent heating and fusing together of the fibers as suggested by step D. Such a recessed support or receptacle 10 may be used repeatedly in forming many like optical devices.

In carrying out the process of the invention, two alternative procedures for step C are possible. In one procedure a relatively large number of thin straight light-conducting fibers, which are generally indicated by numeral 14, FIGS. 2 and 3, and which have been drawn out and cut to length (steps A and B of FIG. 1), are deposited in the support 10 so as to extend generally longitudinally of the recess 12, as suggested by FIG. 2. From this figure, it will be apparent that the fibers 14 at such a time are not in any particular order, they are simply dropped into the recess 12 and many will be improperly arranged as indicated by the undesired spaces or voids 13 therebetween and others often improperly aligned as indicated by the angled fibers 15. It is desirable, however, to align and compactly nest all of these fibers 14 and also to cause the opposite ends of the grouped fibers to be relatively flat; that is to say arranged with their adjacent ends transversely aligned. Transverse alignment may be quickly and easily accomplished by covering the open top of the support 10 to hold the fibers 14 within the recess 12 and then up-ending the support and slightly tapping or jarring the support to make the fibers, which are loosely fitted in the recess 12, slide longitudinally relative to one another until their adjacent lower ends all strike the flat inner surface of the end wall 10a of the support. This slight jarring of the support 10 while in a substantially vertical position also assists somewhat in causing the fibers to seek a side-by-side parallel relationship. Thereafter, the support 10 in a horizontal position may be vibrated, as will be presently described, to insure that all of the fibers are, in fact, accurately arranged in a parallel relation to each other and also to bring about a compact nesting thereof.

The alternative procedure referred to above is slightly preferred, however, since it adapts itself more readily to a continuous and substantially automatic process. This procedure is carried out by arranging suitable mechanical means so as to direct each straight unit length of fiber into the recess 12 of the support 10 as soon as it is cut and by having the support continuously vibrating at this time to cause the fibers to properly align themselves and simultaneously settle into a compact nested geometric arrangement. It may be at this time convenient to have the support longitudinally tilted slightly so as to also insure simultaneous gravitational movement of an end of each fiber into engagement with the inner surface of an end wall 10a of the recessed support 10.

The vibrating of the support or receptacle 10 to properly arrange the fibers 14 in either of the procedures mentioned above may be accomplished by having the support 10 positioned on a platform 16 of an oscillating or vibrating mechanism 18 such as indicated in FIG. 3. The platform 16 is adapted to be oscillated or vibrated in a transverse direction as indicated by arrow 20 or a vertical direction as indicated by arrow 21 or by a combination of both by operation of the mechanism 18. The support 10 is removably held in a fixed position on the platform 16 by suitable means such as a pair of elongated L-shaped guide or confining members 22 attached to the platform 16 as shown and extending in the longitudinal direction of said platform and a second pair (not shown) but arranged in a transverse direction on the platform so as to engage the opposite ends of the support 10. Thus it can be seen that the support or receptacle 10 may be simply and quickly placed or removed from between said members 22 and when in place this receptacle will be retained in place on platform 16 during the vibrating thereof.

When the support or receptacle 10 is positioned in this manner on the platform 16, the longitudinal axes of the fibers 14 will extend in a direction substantially normal to the direction of oscillation or vibration of the device 18, whether they be vertical or horizontal, and when the device 18 is operating at a proper relatively high or even supersonic frequency, the fibers 14 will be vibrated within the support 10 and caused to automatically align themselves and settle in an orderly fashion therein, as shown in FIG. 2, with their side edges in engaging side-by-side parallel relation with each other.

Broadly speaking many different frequencies of oscillation or vibration both within and above the audible range have been found useful for aligning and compactly nesting fibers, although it is possible that for a specific case a specific frequency of vibration or specific range of frequencies may be preferred. For example, it has been found that by oscillating or vibrating the receptacle or support 10 at a supersonic frequency, an assembly of relatively small straight fibers, in the order of .010" in diameter and approximately 6" long, will quickly and accurately rearrange themselves and settle into precisely aligned parallel relation with each other. Of course, each assembly of fibers must be oscillated or vibrated at a frequency rate which is such as to cause them to behave as if their coefficient of friction has substantially vanished; at which time each fiber will gravitally seek the lowest possible position available in the support 10. This results in a compact arrangement and automatic alignment of the assembly. Even thin straight fibers six inches long and only half this diameter can in this manner be accurately aligned and assembled even though these thin fibers possess considerably more flexibility.

The fibers 14, shown in FIGS. 2 and 3 of the drawings have been illustrated as being circular in cross-section and each fiber comprises a main body portion or core 14a and thin outer coating 14b. The core is formed of a relatively high refractive index transparent or light-conducting material such as a clear glass having smooth side walls which act as mirror-like surfaces providing internal reflection for the light which has entered at one end of the core or filaments and is traveling towards the opposite ends thereof. The thin outer coating or layer 14b is formed of light insulating material such as a glass of a lower index of refraction than that of the core and this is to prevent optical interaction between the fibers 14 when they are grouped together in engaging side-by-side relation with each other.

The coating or layer 14b may also serve as means for securing the fibers 14 together without allowing the cores to optically engage each other. For example, when the fibers 14 have been compactly arranged and accurately aligned relative to each other in the support 10 in the manner set forth above, the support 10 is removed from the vibrating mechanism 18 and may be placed in a suitable furnace, or the like, which is capable of heating the fibers 14 to a temperature sufficient to fuse the engaging surface parts thereof without causing appreciable distortion of said fibers.

In instances wherein the fibers 14 are formed of clear light-conducting plastic rather than glass, the coating 14b may be formed of a clear resinous material or the like of lower index and which is such that when slightly heated or otherwise softened will form a bond between contacting fibers.

It can be seen that when forming fiber optical devices of fibers which are circular in cross-section, see FIG. 3, that although the fibers are uniformly and compactly packed in the manner illustrated there will inherently exist a plurality of longitudinally extending voids or air spaces 17 between the individual fibers. In certain instances, particularly in cases where a bundle of fibers are to be drawn a second or third time for further filament reduction, in the manner disclosed in the co-pending application Ser. No. 669,883, the air betweeen the fibers for best results should be evacuated or otherwise allowed to escape during the drawing operation. In such cases it may be preferable to use a different shape of fiber and thus avoid the occurrence of entrapped air bubbles or the like in the resultant multiple fiber or filament so formed.

In FIG. 4 there is shown a plurality of fibers 24 which are each square in cross-section instead of round and when compactly packed in accurately aligned assembled relation with each other, as shown in FIG. 5, a composite assembly of fibers will be formed without including voids or air spaces of any appreciable size between the individual fibers. The fibers 24 of FIG. 4 are shown randomly arranged in a support 25, which is substantially identical to support 10 of FIGS. 2 and 3, and these fibers 24 may be aligned by vibrating the support 25 on the mechanism 18 in substantially the same manner as disclosed above for the assembly of the fibers 14.

It is pointed out that fibers which are of other cross-sectional configurations such as triangular, rectangular, hexagonal, octagonal, etc. may also be assembled in accurately aligned, compactly packed relation with each other in the manner described above and substantially all air will be automatically excluded by such close nesting arrangements. Furthermore, the supports or receptacle 10, or 25, may be provided with a recess of any desired shape instead of the rectangular recess 12 shown in FIGS. 2 and 3 when desired. As will be described more fully hereinafter, this may be advisable so as to cause the outer cross-sectional contour of an assembly of fibers which is being formed therein to assume a predetermined shape while said fibers are being vibrated into aligned side-by-side relation with each other.

While the individual light-conducting elements or fibers 14 and 24 have been described hereinabove as having light-insulating coatings or layers about their cores before assembly, it is to be understood that uncoated cores or fibers may be assembled in much the same manner. Furthermore, by following the teachings of the present invention as suggested by the means and method steps of FIGS. 6 and 7, as described below, it is possible to simultaneously align, light-insulate and secure uncoated elements or fibers together in a compactly packed and accurately aligned relation with each other.

Referring more particularly to FIG. 6 wherein a similar receptacle or support 26 is shown, it will be seen that there is indicated in the recess 30 therein a plurality of light-conducting elements or fibers 32 of clear high index material within a matrix material 28 of special preparation and of low viscosity. The matrix material, in fact, preferably comprises a clear air-drying plastic in liquid form to which has been added very small or even microscopic particles of clear transparent material having substantially the same low index of refraction as that of the liquid. These small particles in suspension in the liquid are indicated at 29 in FIGS. 6 and 7, and a preferred size would be between 1 and 5 microns. Since the opposite ends of the recess 30 are walled in (or may be closed by removable end walls or the like) the recess 30 may be first partially filled with the plurality of light-conducting elements or fibers 32 and then the liquid matrix material 28 and suspended particles 29 may be poured into the recess.

With the fibers 32 in FIG. 6 so randomly placed in the recess 30 of the support 26 and with the liquid added, and with the support in place on the vibrating mechanism 18, the fibers may be vibrated in the above-disclosed manner to cause them to rearrange and settle in the liquid matrix material and become automatically aligned and compactly arranged in side-by-side parallel relation with each other. However, as shown in FIG. 7, all of the fibers 32 will be separated from one another by the low index liquid matrix material in amounts at least sufficient to insure being optically insulated from each other. The separation of the fibers and the amounts of low index material between fibers will be controlled by the size of the individual small particles in the liquid which will become lodged between each and every adjacent pair of fibers and will positively maintain the spacings desired.

By selecting a clear matrix material of a lower index of refraction than the high refractive index of the fibers 32 and by keeping the viscosity of the matrix material low enough so as to allow movement of the liquid and suspended particles between the fibers, it is possible to cause the fibers, during the vibration of support 26, to become accurately aligned without having the individual fibers 32 actually touching each other. Various shapes of fibers may be so assembled and when the liquid material has hardened, it will securely bond the individual fibers 32 together and thus form a solid bar or unitary structure consisting of many optically separated individual light-conducting fibers.

Acceptable results may also be obtained with fibers of various cross-sectional shapes in a slightly different manner; by first vibrating the fibers into alignment and compact arrangement while the receptacle is slightly tilted and thereafter slowly adding the matrix liquid with the suspended particles therein at one end of the receptacle while it continues to vibrate. Even though the assembled fibers may appear compactly arranged before the liquid is added, nevertheless, the liquid and particles will flow down and around the end of the bundle and will then penetrate into the voids between the individual fibers. Penetration between and among adjacent round fibers occurs readily and a little more slowly in the case of fibers of other cross-sectional shapes.

It will be apparent from the preceding description that transverse alignment of the adjacent ends of the fibers 14, 24 or 32 as the case may be is advantageous since both ends of a finished assembled bundle of fibers are usually cut, or ground, and polished to form a predetermined flat or curved optical surface thereon for receiving or transmitting light rays.

In FIG. 8, for example, there is illustrated in a sectional perspective view a portion of a fiber optical device which may be readily and efficiently formed by the process of the present invention. By providing a suitably shaped recess in the support or receptacle in which the individual fibers are to be collected and vibrated, a great number of like light-conducting fiber-like members 34 may be collected and vibrated into aligned parallel side-by-side nested relation with each other and even secured together by fusing or by a suitable bonding agent or matrix material to form an optical image transfer device or assembled component.

For instance, a recess of desired cross-sectional contour shape is shown by way of illustration at 40 in a two-part receptacle or mold 42 in FIG. 9. This receptacle, of course, would be of considerably greater length than the length of the portion illustrated in the drawing, and would be closed at its opposite ends. Thus, only a narrow elongated opening 44 need be provided between the two halves 42a and 42b of the receptacle at the top thereof for admitting successive fibers, and for admitting a matrix liquid, if desired. Of course, in the latter case, it might be desirable to pre-coat the walls of the recess with a suitable material to prevent adhesion of the matrix material during drying or setting thereof; so that the halves may thereafter be easily separated.

In the preceding description, the supports or receptacles described have been referred to as having elongated trough-like recesses therein which is preferably at least a little longer than the length of the individual fibers to be collected therein. It should be here noted, on the other hand, that the width of the recesses in each case is somewhat less than the length of the individual fibers. This will insure that each of the fibers will be at least partially aligned as soon as it is placed in the receptacle. In some cases the length, width and depth of the receptacle will be made to correspond to the size of the optical device being formed. In other cases, one or more of these dimensions may be different. For example, a flexible optical image transfer device (for use in forming a fiberscope) 18 inches long and ⅜ inch square in cross-section, may be formed as a unitary assembly of many flexible fibers, and only the opposite ends of these accurately aligned and assembled fibers would be fixedly secured together and then ground and polished. In a different situation, it might be preferable to build up articles such as television face plates by using many long fibers accurately assembled and bonded together, as in a receptacle or mold of the type shown in FIG. 9, and to thereafter transversely slice or cut off in known manner from an end of such an assembly one relatively thin blank after another. Such a blank is indicated at 36 in FIG. 8, thereafter, the front and rear surfaces of this blank may then be optically finished by grinding and polishing to provide any predetermined optical surface shape desired, and in the present disclosure a spherically curved optically ground and polished rear surface is indicated by the dot-dash line 38 and a ground and polished flat front surface is indicated by dot-dash line 39.

Of course, differently transversely curved or differently transversely shaped bottom and side walls for the recess of any of the receptacles disclosed may be used and may aid both in properly aligning the individual fibers during vibration and in producing the contour shape desired in the product being formed.

From the foregoing, it can be seen that improved, accurate and economical means and a rapid and efficient method have been provided for accomplishing all of the objects and advantages of the invention. However, it should be apparent that many changes in the details of construction, arrangement of parts and steps in the method disclosed herein may be made by those skilled in the art without departing from the spirit of the invention as expressed in the accompanying claims; and the invention is not to be limited to the exact matters shown and described herein as only the preferred embodiments have been given by way of illustration.

Having described my invention, I claim:

1. The method of forming a unitary optical image transfer assembly comprising dropping a relatively large number of similar elongated flexible members of light-conducting material into a receptacle having an elongated recess of predetermined size and shape formed therein, each of said flexible members being of a relatively small predetermined cross-sectional shape and being of considerably greater length than the transverse dimension thereof, said recess being of such a length as to accommodate said members in the longitudinal direction thereof while resting upon their sides in said recess, and the width of said recess being less than its length by an amount which is sufficient to insure that each light-conducting member therein will extend more in the longitudinal direction of said receptacle than in the transverse direction thereof, subjecting said receptacle to a vibratory motion in such a manner as to have at least a component of said vibratory motion acting in a direction at right angles relative to the longitudinal direction of said receptacle, the rate of vibration of said receptacle being sufficient to lower the coefficient of friction between adjacent light-conducting members therein, whereby the members in said receptacle will move under the influence of gravity and re-align themselves in said recess in side-by-side parallel contacting relation with each other and form a compact assembly, and thereafter treating said assembly in such a manner as to fixedly secure adjacent members together.

2. The method defined in claim 1 and wherein said receptacle is maintained in a slightly longitudinally tilted position during at least a part of said vibratory motion so that each of the elongated flexible members therein will move into engagement with an end wall of said receptacle and become transversely aligned with the adjacent ends of the other members in said receptacle.

3. The method of forming a unitary optical image transfer assembly comprising dropping a relatively large number of similar elongated flexible members of glass into a receptacle having an elongated recess of predetermined size and shape formed therein, each of said flexible members being of a relatively small predetermined cross-sectional shape and being of considerably greater length than the transverse dimension thereof, said recess being of such a length as to accommodate said members in the longitudinal direction thereof while resting upon their sides in said recess, and the width of said recess being less than its length by an amount which is sufficient to insure that each member therein will extend more in the longitudinal direction of said receptacle than in the transverse direction thereof, subjecting said receptacle to a vibratory motion in such a manner as to have at least a component of said vibratory motion acting in a direction at right angles relative to the longitudinal direction of said receptacle, the rate of vibration of said receptacle being sufficient to lower the coefficient of friction between adjacent glass members and allow said members to move under the influence of gravity and re-align themselves in said recess in side-by-side parallel contacting relation with each other and form a compact assembly, and thereafter heating said assembly of glass members to such a temperature as to fixedly fuse adjacent members together.

4. The method of forming a unitary optical image transfer assembly comprising dropping a relatively large number of similar elongated flexible members of light-conducting material into a receptacle having an elongated recess of predetermined size and shape formed therein, each of said flexible members being of a relatively small predetermined cross-sectional shape and being of considerably greater length than the transverse dimension thereof, said recess being of such a length as to accommodate said members in the longitudinal direction thereof while resting upon their sides in said recess, and the width of said recess being less than its length by an amount which is sufficient to insure that each light-conducting member therein will extend more in the longitudinal direction of said receptacle than in the transverse direction thereof, subjecting said receptacle to a vibratory motion in such a manner as to have at least a component of said vibratory motion acting in a direction at right angles relative to the longitudinal direction of said receptacle, the rate of vibration of said receptacle being sufficient to lower the coefficient of friction between adjacent light-conducting members therein, whereby the members in said receptacle will move under the influence of gravity and re-align themselves in said recess in side-by-side parallel contacting relation with each other and form a compact assembly, and thereafter treating said assembly at at least two spaced preselected locations along the length of the assembled members in such a manner as to fixedly secure adjacent members together and provide at said locations substantially identical geometric arrangements considered in the cross-sectional direction thereof.

5. The method of forming a unitary optical image transfer assembly comprising dropping a relatively large number of similar elongated flexible members of light-conducting material of high refractive index into a receptacle having an elongated recess of predetermined size and shape formed therein, each of said flexible members being of a relatively small predetermined cross-sectional shape and being of considerably greater length than the tranverse dimension thereof, said recess being of such a length as to accommodate said members in the longitudinal direction thereof while resting upon their sides in said recess, and the width of said recess being less than its length by an amount which is sufficient to insure that each light-conducting member therein will extend more in the longitudinal direction of said receptacle than in the transverse direction thereof, adding a clear liquid of lower refractive index having microscopic solid particles of nearly the same index in suspension therein to said receptacle, subjecting said receptacle to a vibratory motion in such a manner as to have at least a component of said vibratory motion acting in a direction at right angles relative to the longitudinal direction of said receptacle, the rate of vibration of said receptacle being sufficient to lower the coefficient of friction between adjacent light-conducting members therein, whereby the members in said receptacle will move under the influence of gravity and re-align themselves in said recess in side-by-side parallel closely spaced relation with each other with said liquid and particles between adjacent members, and thereafter allowing said liquid to harden and fixedly secure said adjacent members together.

6. The method of forming a unitary optical image transfer assembly comprising dropping a relatively large number of similar elongated flexible members of light-conducting material of high refractive index into a receptacle having an elongated recess of predetermined size and shape formed therein, each of said flexible members being of a relatively small predetermined cross-sectional shape and being of considerably greater length than the transverse dimension thereof, said recess being of such a length as to accommodate said members in the longitudinal direction thereof while resting upon their sides in said recess, and the width of said recess being less than its length by an amount which is sufficient to insure that each light-conducting member therein will extend more in the longitudinal direction of said receptacle than in the transverse direction thereof, subjecting said receptacle to a vibratory motion in such a manner as to have at least a component of said vibratory motion acting in a direction at right angles relative to the longitudinal direction of said receptacle, the rate of vibration of said receptacle being sufficient to lower the coefficient of friction between adjacent light-conducting members therein, whereby the members in said receptacle will move under the influence of gravity and re-align themselves in said recess in side-by-side parallel relation with each other, adding a clear liquid of lower refractive index having microscopic solid particles of nearly the same index in suspension therein to said receptacle, again vibrating said receptacle to cause said liquid and particles to move into positions between all adjacent members, and thereafter allowing said liquid to harden and fixedly secure said adjacent members together.

References Cited in the file of this patent

UNITED STATES PATENTS

| | | |
|---|---|---|
| 2,255,426 | Lamesch | Sept. 9, 1941 |
| 2,260,517 | Hamilton | Oct. 28, 1941 |
| 2,272,850 | Poole | Feb. 10, 1942 |
| 2,304,467 | Maltby | Dec. 8, 1942 |
| 2,522,082 | Arnold | Sept. 12, 1950 |
| 2,781,549 | Milne | Feb. 19, 1957 |
| 2,825,260 | O'Brien | Mar. 4, 1958 |